Nov. 3, 1970
W. H. DU BOIS
3,537,759
HYDRAULIC BRAKE ACTUATING AND CONTROL SYSTEM
Filed Feb. 12, 1969
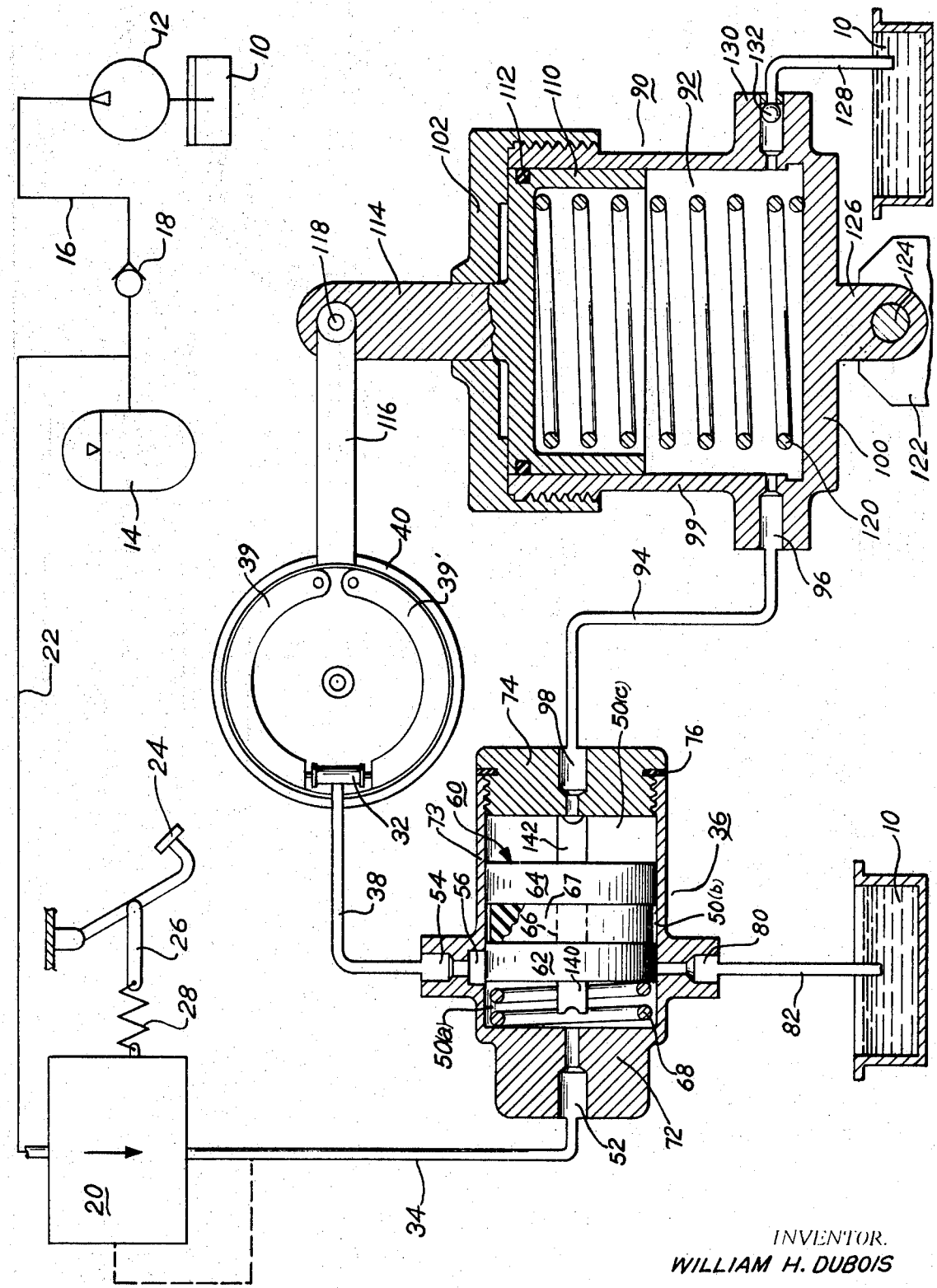
INVENTOR.
WILLIAM H. DUBOIS
BY Hobbs & Green
ATTORNEYS

United States Patent Office 3,537,759
Patented Nov. 3, 1970

3,537,759
**HYDRAULIC BRAKE ACTUATING AND
CONTROL SYSTEM**
William H. Du Bois, 1646 N. O'Brien St.,
South Bend, Ind. 46628
Filed Feb. 12, 1969, Ser. No. 799,549
Int. Cl. B60t 8/02
U.S. Cl. 303—21                              11 Claims

ABSTRACT OF THE DISCLOSURE

A hydraulic brake actuating and control system in which the line between the operator control means and the brake cylinder includes a control valve responsive to the torque on the brake backing or torque plate. The control valve includes an element for restricting the flow of fluid to the cylinder and for momentarily relieving the pressure in said cylinder, the valve element being controlled by a torque arm which actuates a fluid pressurizing device for moving the valve from a nonoperating position to a position where pressure in the brake cylinder is relieved.

---

In the conventional hydraulic brake system, the brakes are normally actuated to the extent required to obtain the desired braking, and if the coefficient of friction of the friction elements increases as the vehicle decreases in speed, violent oscillation of torque (chatter) may occur, or inadvertent skidding may result. It is thus desirable to eliminate or minimize the variation in torque due to variable frictional characteristics, enabling the operator to attain the most consistent braking effect and eliminate a major cause of chatter and high dynamic torque loads. Under modern high speed braking conditions, it is practically impossible to fabricate a friction material with constant co-efficient of friction throughout the range of temperature, velocity, and pressure encountered in a single stop of the vehicle. It is therefore one of the principal objectives of the present invention to provide a brake actuating and control system in which the torque resulting from application of the brakes is sensed and is utilized to relieve the braking pressure and hence to minimize the variation in torque due to variable friction characteristics.

Another object of the invention is to provide a vehicle braking system of the hydraulic type having a brake pressure regulator valve controlled by the operator, and brake actuating cylinders, in which a control valve is operated in response to the braking torque to relieve the pressure in the brake actuating cylinders at a predetermined maximum torque value for said regulator valve pressure (equivalent to a maximum value of the coefficient of friction for the friction elements), and in which the torque actuated control valve may operate intermittently during the braking operation to maintain effective control on maximum "Torque/Pressure" value.

Still another object of the invention is to provide a relatively simple and effective control mechanism for hydraulic brakes which is responsive to the torque of the brake backing plate and which can be incorporated in most standard or conventional vehicle hydraulic braking systems without making a substantial change in the basic system.

Additional objects and advantages of the invention will become apparent from the following description and accompanying drawing, wherein:

The drawing illustrates schematically the brake system embodying the present invention, the various conventional parts of the system being illustrated by symbols or in outline form.

Referring more specifically to the drawing, the hydraulic system in which the present system is incorporated includes a hydraulic fluid reservoir 10, a pump 12, and an accumulator 14 connected to the pump by a line 16 which includes a check valve 18. The line 16 between the check valve and the accumulator is connected to a brake pressure regulating valve 20 by a line 22. The pressure regulator valve is of a conventional and well known construction and is operated by the brake pedal 24 and linkage 26 containing a spring 28. The regulator valve 20 is connected to the brake cylinder 32 by a line 34, torque control valve 36 and line 38. The return of the fluid to reservoir 10 upon completion of the braking operation normally is through lines 38 and 34 and through the control valve 36 and regulator valve 20. The type of brake shown in the drawing consists of two brake shoes 39 and 39' mounted on a backing or torque plate 40 which is connected to the axle housing of the vehicle in such a manner that it will move angularly when the brake torque exceeds a predetermined value. The type of brake operated by the present system is not limited to the one shown and may be either the brake shoe type or the disc type.

While the present invention is designed primarily for a full power system for aircraft, the present invention is capable of being effectively used in a power assist type of system. The details of the actual brake will not be described herein since they are conventional or standard parts.

Control valve 36 between lines 34 and 38 normally merely transmits the hydraulic fluid from regulator valve 20 to brake cylinder 32, the communication between lines 34 and 38 being through chamber 50(a) in the control valve and through connections 52 and 54. An orifice 56 in connection 54 is utilized in controlling the flow by the regulator valve when it becomes operative. The control valve includes a valve element generally indicated by numeral 60 consisting of two disc shaped elements 62 and 64 mounted rigidly on a stem 66. The peripheral surface of element 62 extends over orifice 56, and as valve element 60 moves from right to left as viewed in the drawing, the orifice is closed with reference to the fluid in chamber 50(a) in the left hand end of the control valve and is open with reference to chamber 50(b) consisting of the space between the two elements 62 and 64 at the periphery of member 67. The valve element 60 is urged to its right hand position, as viewed in the drawing, by a coil spring 68 reacting between the element and the end wall 72 joined integrally to cylindrical side walls 73. End wall 74 threadedly received in the cylindrical side walls and retained in a fluid-tight relation by gasket 76 between the end of the side walls and an outwardly extending flange on end 74, forms a stop for valve element 60 in the right hand direction. Throughout normal operation of the brake, the hydraulic fluid flows in either direction through line 34, connection 52, chamber 50(a) between element 62 and end wall 72, orifice 56 of connection 54 and line 38. The orifice 56 is essentially unrestricted by element 62 when the brake is inoperative or is operating at relatively low pressures.

Valve element 60 is operated to momentarily interrupt the communication between orifice 56 and connection 52 by movement toward the left hand end of chamber 50(a). As orifice 56 is closed with respect to chamber 50(a), the orifice establishes communication with the space between elements 62 and 64 i.e. chamber 50(b), which in turn communicates with connection 80 and return line 82 to reservoir 10. Reservoir 10 shown at the bottom of the drawing and in the upper right hand corner is the same receptacle; however, for convenience, it has been shown as two separate units.

The valve element 60 is moved to the left to interrupt the communication between the regulator valve 20 and cylinder 32 by a fluid pressure creating mechanism consisting of a torque cylinder 90 having a chamber 92 connected to chamber 50(c) at the right hand end of chamber 50 by a line 94, and connections 96 and 98 on the torque cylinder and control valve, respectively. The torque cylinder includes cylindrical walls 99 enclosing chamber 92 and end walls 100 and 102, end wall 102 being threadedly received on the upper end of cylindrical side walls 99. Mounted in chamber 92 is a piston 110 having an annular gasket 112 forming essentially a fluid-tight connection between the inner side surface of side wall 99 and the external surface of piston 110. The piston is connected to the torque plate by a stem 114 and a torque arm 116, the stem being rigidly connected to the piston, and the stem and torque arm being pivotally connected to one another by a pin 118. The piston is urged to its uppermost position by a coil spring 120 reacting between end 100 and the underside of the piston. The cylinder is mounted rigidly on a supporting structure 122 of the vehicle by a pin 124 extending rigidly through stem 126 rigidly secured to end 100. Chamber 92 is connected to reservoir 10 by a conduit 128 and connection 130 in the side wall 99 of the torque cylinder. A check valve 132 which permits fluid to be drawn from the reservoir 10 through conduit 128 to chamber 92 is mounted in connection 130 and prevents the return of fluid from chamber 92 to the reservoir. As the torque plate rotates in the clockwise direction, as viewed in the drawing, when excessive pressure is applied to the brakes, torque arm 116 moves downwardly, forcing piston 110 downwardly against the force of spring 120, and forces hydraulic fluid from chamber 92 through conduit 94 to the right hand end of chamber 50, thus causing element 60 to move leftward from the position shown in the drawing, thereby closing orifice 56 with respect to chamber 50(a) and opening the orifice with respect to the space chamber 50(b). This establishes communication between the two elements and drain line 82. The valve element includes stems 140 and 142 which serve as stops for the element, stem 140 seating on end wall 72 and stem 142 seating on end wall 74, as the valve moves to the left or right as viewed in the drawing. A slot is provided in the ends of the two stems 140 and 142 to prevent the stems from interfering with the flow of fluid into and from chamber 50.

In the operation of the present hydraulic brake actuating and control system, starting with the brakes off, pressure is maintained in line 22 by pump 12 and accumulator 14. When the brakes are applied by depressing pedal 24, the fluid which is already in line 34, control valve 36, and line 38, is pressurized by the fluid flow from line 22 to line 34. Since the valve element 60 is in the position shown in the drawing, orifice 56 communicates with chamber 50(a), thus permitting the higher pressure of the hydraulic fluid to pass to cylinder 32. Upon the application of the pressure to the two brake shoes, there is a tendency for the torque plate 40 to rotate in the clockwise direction, as viewed in the drawing. However, rotation of the torque plate is prevented by spring 120 through piston 110, stem 114 and arm 116. In the event the torque exceeds a predetermined value as determined by spring 120, piston 110 moves downwardly, pressurizing the fluid in chamber 92, causing it to flow through conduit 94 to chamber 50(c), thus causing valve element 60 to move toward the left and thereby establishing communication between orifice 56 and the space between elements 62 and 64, and simultaneously or subsequently establishing communication between said space and connection 80 and conduit 82. This permits the high pressure fluid in line 38 to partially drain to reservoir 10, and relieves the excess torque on torque plate 40, thus permitting spring 120 to return the piston to its original position. As the piston moves upwardly, the pressure is relieved in line 94 and chamber 50(c), thus permitting the valve element 60 to return to its original position, as seen in the drawing. This operation may be repeated any number of times during any single application of the brakes if the torque at any given pressure exceeds a predetermined value. Control valve 36 effectively prevents substantial variation in the torque for any given actuating pressure, thus providing a smoother and more consistent brake actuation. After the pressure has been relieved on pedal 24, regulator valve 20 interrupts the communication between the conduits 22 and 34 and returns the excess fluid to the reservoir.

Since the present control valve operates momentarily for the purpose of temporarily relieving the pressure in the brake cylinder to prevent or minimize fluctuations in braking torque, this operation can be performed by the control valve without actually returning the fluid through line 82 to the reservoir. This is accomplished by utilizing resilient member 67 which compresses under excess brake fluid pressure and thereby provides temporary additional space in chamber 50(b) for fluid from line 38. With this arrangement, chamber 50(b) communicates with orifice 56 without communicating with line 82, if this preliminary operation sufficiently relieves pressure to prevent excessive torque. If this occurs, element 62 returns to its original position at the left end of chamber 50 without at any time establishing communication between chamber 50(b) and line 82. The foregoing operation utilizing compressible member 67 is essentially the same as the operation without member 67; i.e. when member 67 is compressed or when communication with line 82 is established, to relieve the pressure in line 38, optimum brake operation and hence vehicle control are obtained.

It is seen from the foregoing description of the operation that the control valve 36, which is relatively simple and which can be incorporated easily into a brake system, is effectively actuated by the torque plate to prevent or minimize torque variations and to provide a smooth braking operation irrespective of the pressure applied during the braking operation. The control valve 36 and pressure mechanism 90 may be modified to adapt them to various hydraulic brake systems, and these two components may be varied in size and construction in order to satisfy requirements. For the purpose of better illustrating the invention, the pressure mechanism is shown larger than the brake. It, as well as the control valve, would normally be substantially smaller than the brake assembly.

While only one embodiment of the present hydraulic brake actuation and control system has been described in detail herein, various changes and modifications may be made without departing from the scope of the invention.

I claim:

1. In a vehicle hydraulic brake system having an operator actuated brake operating means, brake cylinders, brake fluid supply line connecting said brake operating means with said brake cylinders, and an angularly moveable brake torque plate: a control valve in said line having a chamber and a normally open valve element therein between said operating means and said cylinders, and a means connected to said torque plate for moving said valve element to a position where communication between said brake operating means and said cylinders is substantially restricted and the pressure in said brake cylinders is relieved, said means connected to said torque plate being actuated when the torque on said torque plate increases to a predetermined value.

2. A hydraulic brake system as defined in claim 1, in which said brake system includes a fluid pressurizing means and in which said operator actuated brake operating means consists of a regulating valve for controlling fluid from a reservoir.

3. A hydraulic brake system as defined in claim 1, in which said means connected to said torque plate includes a cylinder and piston, fluid in said cylinder pressurized by said piston, an arm connected to said torque plate for moving said piston in the direction to pressurize the fluid in said cylinder, and a conduit connecting said cylinder to said control valve for controlling said valve element in response to torque on said torque plate.

4. A hydraulic brake system as defined in claim 2, in which said means connected to said torque plate includes a piston and cylinder, fluid in said cylinder pressurized by said piston, an arm connected to said torque plate for moving said piston in the direction to pressurize the fluid in said cylinder, and a conduit connecting said cylinder to said control valve for controlling said valve element in response to torque on said torque plate.

5. A hydraulic brake system as defined in claim 3, in which a spring returns said piston and torque plate toward their original position after the pressure in the respective brake cylinders has been relieved.

6. A hydraulic brake system as defined in claim 4, in which a spring returns said piston and torque plate toward their original position after the pressure in the respective brake cylinders has been relieved.

7. A hydraulic brake system as defined in claim 1, in which said valve element consists of a spool having two spaced lands thereon for controlling the fluid when the torque on said torque plate reaches a predetermined value and a fluid return line is connected to said space.

8. A hydraulic brake system as defined in claim 1, in which said valve element consists of a spool having two spaced lands thereon for controlling the fluid when the torque on said torque plate reaches a predetermined value and a compressible member is disposed between said lands.

9. A hydraulic brake system as defined in claim 3, in which said control valve includes an orifice communicating with the chamber in said valve and a fluid pressure responsive means for moving said valve element relative to said orifice for relieving the pressure in said brake cylinders when torque reaches a predetermined value.

10. A hydraulic brake system as defined in claim 4, in which said control valve includes an orifice communicating with the chamber in said valve and a fluid pressure responsive means for moving said valve element relative to said orifice for relieving the pressure in said brake cylinders when torque reaches a predetermined value.

11. A hydraulic brake system as defined in claim 4, in which said control valve includes an orifice controlled by the said valve element to relieve the pressure in said brake cylinders when torque reaches a predetermined value.

References Cited

UNITED STATES PATENTS

| | | | |
|---|---|---|---|
| 2,999,567 | 9/1961 | Adams | 188—181 |
| 3,008,548 | 11/1961 | Moyer | 303—21 X |
| 3,294,204 | 12/1966 | Zubaty | 303—21 X |
| 3,404,758 | 10/1968 | Mortimer | 188—181 |

MILTON BUCHLER, Primary Examiner

J. J. McLAUGHLIN, Jr., Assistant Examiner

U.S. Cl. X.R.

188—181; 303—10, 61